United States Patent
Sivavakeesar et al.

(10) Patent No.: US 11,452,070 B2
(45) Date of Patent: Sep. 20, 2022

(54) USER EQUIPMENT, BASE STATION AND METHOD FOR PAGING PROCEDURE

(71) Applicant: PANASONIC INTELLECTUAL PROPERTY CORPORATION OF AMERICA, Torrance, CA (US)

(72) Inventors: Sivapathalingham Sivavakeesar, Langen (DE); Hidetoshi Suzuki, Kanagawa (JP); Ankit Bhamri, Langen (DE); David Gonzalez, Langen (DE); Tien-Ming Benjamin Koh, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 21 days.

(21) Appl. No.: 16/960,804

(22) PCT Filed: Jan. 11, 2019

(86) PCT No.: PCT/EP2019/050664
§ 371 (c)(1),
(2) Date: Jul. 8, 2020

(87) PCT Pub. No.: WO2019/138060
PCT Pub. Date: Jul. 18, 2019

(65) Prior Publication Data
US 2021/0068073 A1  Mar. 4, 2021

(30) Foreign Application Priority Data
Jan. 12, 2018 (EP) .................................. 18151524

(51) Int. Cl.
*H04W 68/02* (2009.01)
*H04W 68/00* (2009.01)
(Continued)

(52) U.S. Cl.
CPC ....... *H04W 68/02* (2013.01); *H04W 36/0083* (2013.01); *H04W 74/0833* (2013.01)

(58) Field of Classification Search
CPC ............. H04W 68/02; H04W 36/0083; H04W 74/0833; H04W 68/00
(Continued)

(56) References Cited

U.S. PATENT DOCUMENTS

2017/0339609 A1   11/2017  Youn et al.
2018/0352501 A1*  12/2018  Zhang ................... H04W 76/11
(Continued)

FOREIGN PATENT DOCUMENTS

| WO | 2017/098442 A1 | 6/2017 |
| WO | 2017/124003 A1 | 7/2017 |
| WO | 2017/135856 A1 | 8/2017 |

OTHER PUBLICATIONS

3GPP TR 38.801 V14.0.0, "3rd Generation Partnership Project; Technical Specification Group Radio Access Network; Study on new radio access technology; Radio access architecture and interfaces (Release 14)," Mar. 2017, 91 pages.
(Continued)

*Primary Examiner* — Inder P Mehra
(74) *Attorney, Agent, or Firm* — Seed IP Law Group LLP

(57) ABSTRACT

The present disclosure relates to a user equipment (UE) comprising a receiver for receiving a paging message from a base station. A processor determines at least one network slice to which the paging message pertains based on the received paging message. The disclosure further relates to a UE comprising a receiver for receiving information on a plurality of network slices. The information includes for each network slice a shortened network slice ID identifying the respective network slice and includes mapping information defining a mapping between the shortened network slice (Continued)

ID and a full network slice ID. A processor determines a network slice and the corresponding full network slice ID and further determines the corresponding shortened network slice ID based on the received mapping information. A transmitter transmits a data transmission preparation message to the base station that comprises the determined shortened network slice ID.

6 Claims, 5 Drawing Sheets

(51) Int. Cl.
  *H04W 36/00* (2009.01)
  *H04W 74/08* (2009.01)
(58) Field of Classification Search
  USPC ......................................................... 370/329
  See application file for complete search history.

(56) References Cited

U.S. PATENT DOCUMENTS

| | | | | |
|---|---|---|---|---|
| 2019/0159107 | A1* | 5/2019 | Kim | H04W 8/02 |
| 2019/0165996 | A1* | 5/2019 | Klemm | G06F 13/4282 |
| 2021/0144674 | A1* | 5/2021 | Zhang | H04W 72/042 |

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)," Mar. 2017, 57 pages.
3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.
3GPP TS 23.401 V15.2.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Dec. 2017, 404 pages.
3GPP TS 23.501 V15.0.0, "3rd Generation Partnership Project; Technical Specification Group Services and System Aspects; System Architecture for the 5G System; Stage 2 (Release 15)," Dec. 2017, 181 pages.
3GPP TS 36.213 V14.5.0, 3rd Generation Partnership Project; Technical Specification Group Radio Access Network; Evolved Universal Terrestrial Radio Access (E-UTRA); Physical layer procedures (Release 14), Dec. 2017, 462 pages.
3GPP TS 36.300 V15.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Dec. 2017, 338 pages.
3GPP TS 36.304 V14.5.0, "3rd Generation Partnership Project; Technical Specification Group Radio Access Network; Evolved Universal Terrestrial Radio Access (E-UTRA); User Equipment (UE) procedures in idle mode (Release 14)," Dec. 2017, 49 pages.
3GPP TS 36.321 V14.1.0, "3rd Generation Partnership Project; Technical Specification Group Radio Access Network; Evolved Universal Terrestrial Radio Access (E-UTRA); Medium Access Control (MAC) protocol specification (Release 14)," Dec. 2016, 98 pages.
3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification (Release 15)," Jan. 2018, 776 pages.
3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP) (Release 14)," Sep. 2017, 353 pages.
3GPP TS 38.211 V15.0.0, "3rd Generation Partnership Project; Technical Specification Group Radio Access Network; NR; Physical channels and modulation (Release 15)," Dec. 2017, 73 pages.
3GPP TS 38.300 V15.0.0, "3rd Generation Partnership Project; Technical Specification Group Radio Access Network; NR; NR and NG-RAN Overall Description; Stage 2 (Release 15)," Dec. 2017, 68 pages.
3GPP TS 38.413 V0.5.0, "3rd Generation Partnership Project; Technical Specification Group Radio Access Network; NG Radio Access Network (NG-RAN); NG Application Protocol (NGAP) (Release 15)," Dec. 2017, 89 pages.
Extended European Search Report, dated Jul. 2, 2018, for European Application No. 18151524.8-1231, 6 pages.
International Search Report, dated Apr. 18, 2019, for International Application No. PCT/EP2019/050664, 3 pages.

* cited by examiner

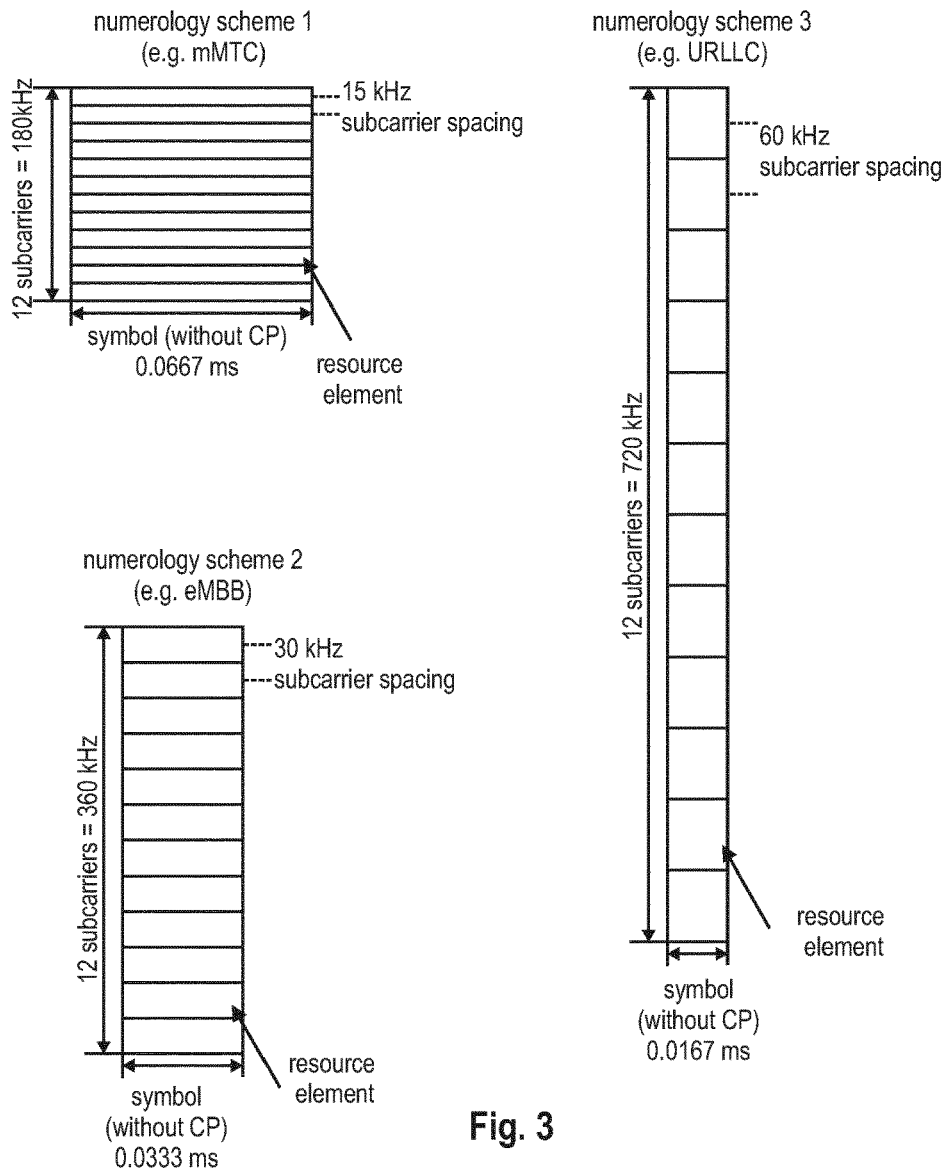
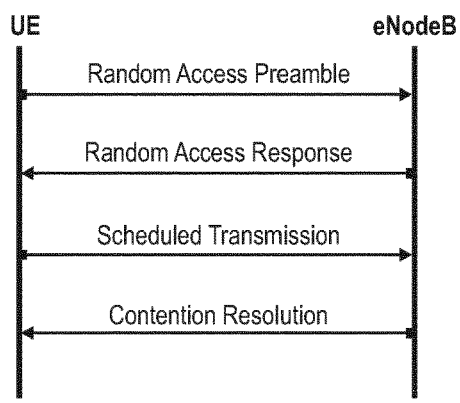
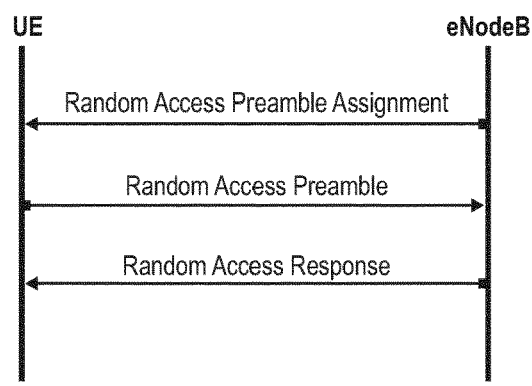
Fig. 3
Fig. 4
Fig. 5

USER EQUIPMENT, BASE STATION AND METHOD FOR PAGING PROCEDURE

BACKGROUND

Technical Field

The present disclosure is directed to methods, devices and articles in communication systems, such as 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 14.3.0 available at www.3gpp.org.

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies.

A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Existing cellular network architectures are relatively monolithic, with a transport network that facilitates mobile traffic to user devices. They may not be flexible enough to so support wider ranges of performance and scalability requirements.

One concept that is currently discussed intensely as a feature to meet the diverse requirements required by 5G NR is "network slicing". The network slicing concept would allow the 5G networks to be sliced logically into multiple virtual networks such that each slice can be optimized to serve a specific application and efficiently support network services so as to provide a high degree of flexibility in enabling several use cases to be active concurrently. Different network slices enable the network elements and functions to be easily configured and reused in each network slice to meet a specific requirement. The implementation of network slicing for 5G is conceived to be an end-to-end feature that includes the core network and the radio access network (RAN). Each network slice can have its own network architecture, engineering mechanism and network provisioning.

Since the standardization for the NR of $5^{th}$ Generation systems of 3GPP is at the very beginning, there are several issues that remain unclear, particularly with regard to network slicing and how this can be implemented.

BRIEF SUMMARY

One non-limiting and exemplary embodiment facilitates providing an improved paging procedure and AS connection and NAS service request procedure in which different entities (UE, gNBs) are participating.

In one general first aspect, the techniques disclosed here feature a user equipment which comprises a receiver which receives a paging message from a base station that controls a radio cell of a mobile communication system in which the user equipment is located. A processor of the UE determines at least one of a plurality of network slices to which the paging message pertains based on the received paging message.

In one general second aspect, the techniques disclosed here feature a method comprising the following steps performed by a UE. A paging message is received from a base station that controls a radio cell of a mobile communication system in which the user equipment is located. At least one of a plurality of network slices to which the paging message pertains is determined based on the received paging message.

In one general third aspect, the techniques disclosed here feature a base station which comprises a transmitter to transmit a paging message to a user equipment, which is located in a radio cell of a mobile communication system controlled by the base station, such that the user equipment can determine at least one of a plurality of network slices to which the paging message pertains based on the received paging message.

It should be noted that general or specific embodiments may be implemented as a system, a method, an integrated circuit, a computer program, a storage medium, or any selective combination thereof. Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 3 illustrates different subcarrier spacings 15 kHz, 30 kHz, and 60 kHz and the resulting symbols durations;

FIG. 4 illustrates the messages exchanged between an eNB and a UE when performing a contention-based RACH procedure;

FIG. 5 illustrates the messages exchanged between an eNB and a UE when performing a contention-free RACH procedure;

DETAILED DESCRIPTION

Basis of the Present Disclosure

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0.

Figure 1:
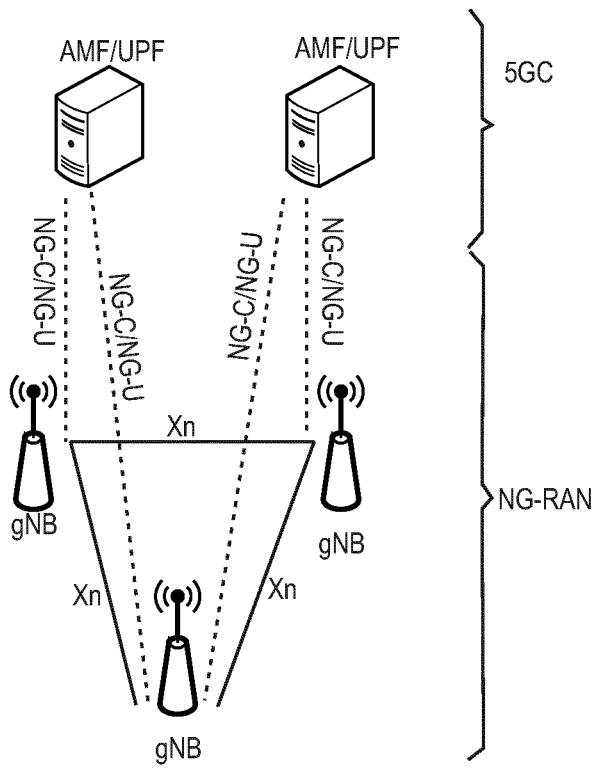
FIG. 1 shows an exemplary architecture for a 3GPP NR system.

Among other things, there has been a provisional agreement on the overall system architecture. The NG-RAN (Next Generation—Radio Access Network) consists of gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the NG-C interface and to the UPF (User Plane Function) by means of the NG-U interface. The NG-RAN architecture is illustrated in FIG. 1, based on TS 38.300 v.15.0.0, section 4.

Figure 2:
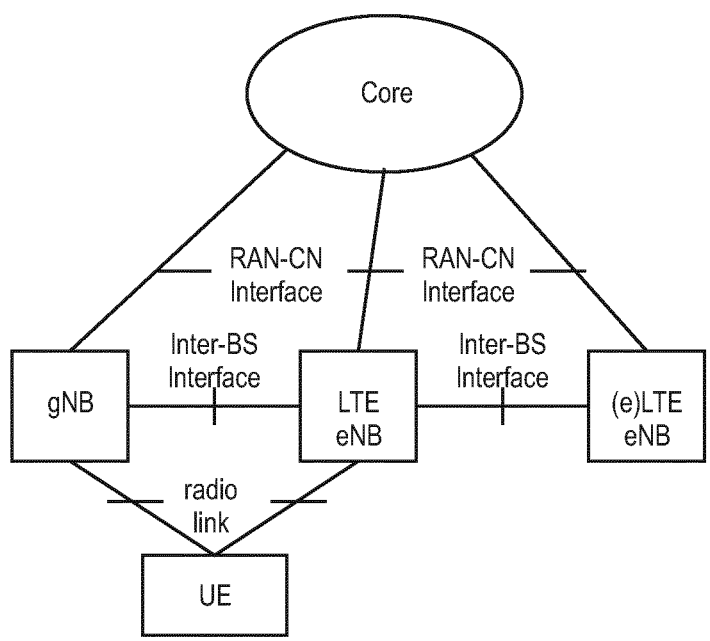
FIG. 2 shows an exemplary user and control plane architecture for the LTE eNB, gNB, and UE.

Various different deployment scenarios are currently being discussed for being supported, as reflected, e.g., in 3GPP TR 38.801 v14.0.0. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of said TR 38.301, while additionally illustrating an LTE eNB as well as a user equipment (UE) that is connected to both a gNB and an LTE eNB. As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

The user plane protocol stack for NR is currently defined in TS 38.300 v15.0.0, section 4.4.1. The PDCP (Packet Data Convergence Protocol), RLC (Radio Link Control) and MAC (Medium Access Control) sublayers are terminated in the gNB on the network side. Additionally, a new access stratum (AS) sublayer (SDAP, Service Data Adaptation Protocol) is introduced above PDCP as described in subclause 6.5 of TS 38.300. The control plane protocol stack for NR is defined in TS 38.300, section 4.4.2. An overview of the Layer 2 functions is given in sub-clause 6 of TS 38.300. The functions of the PDCP, RLC and MAC sublayers are listed in respectively sub-clauses 6.4, 6.3, and 6.2 of TS 38.300. The functions of the RRC layer are listed in subclause 7 of TS 38.300. The mentioned sub-clauses are in TS 38.300.

The new NR layers exemplarily assumed for the 5G systems may be based on the user plane layer structure currently used in LTE(-A) communication systems. However, it should be noted that no final agreements have been reached at present for all details of the NR layers.

As identified in TR 38.913, use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC requires high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead. In 3GPP RAN1#84bis meeting (Busan, April 2016), it was agreed that it is necessary for NR to support more than one value of subcarrier spacing. The values of subcarrier spacing are derived from a particular value of subcarrier spacing multiplied by N where N is an integer. In the RAN1 meeting RAN1#85 (Nanjing, May 2016) it was concluded as a working assumption that the LTE-based numerology including 15 kHz subcarrier spacing is the baseline design for the NR numerology. For the scaling factor N, $N=2^n$ was concluded as the baseline design assumption for the NR numerology. The down selection of numerology candidates might be done in future meetings. Correspondingly, subcarrier spacing of 15 kHz, 30 kHz, 60 kHz . . . are being considered at the moment. FIG. 3 exemplarily illustrates three different subcarrier spacing (15 kHz, 30 kHz, and 60 kHz) and the corresponding symbol duration. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.0.0.

RACH Procedure

No final agreement has been reached with regard to the RACH (Random Access Channel) procedure in 5G NR. As described in section 9.2 of TR 38.804 v14.0.0, the NR RACH procedure may support both contention-based and contention-free random access, in the same or similar manner as defined for LTE. Also, the design of the NR RACH procedure shall support a flexible message-3 size, similar as in LTE although its size might be quite limited.

The LTE RACH procedure will be described in the following in more detail, with reference to FIGS. 4 and 5. A mobile terminal in LTE can only be scheduled for uplink transmission, if its uplink transmission is time synchronized. Therefore, the Random Access Channel (RACH) procedure plays an important role as an interface between non-synchronized mobile terminals (UEs) and the orthogonal transmission of the uplink radio access. For instance, the Random Access in LTE is used to achieve uplink time synchronization for a user equipment which either has not yet acquired, or has lost, its uplink synchronization. Once a user equipment has achieved uplink synchronization, the eNodeB can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

LTE offers two types of random access procedures allowing access to be either contention based, e.g., implying an inherent risk of collision, or contention free (non-contention based). A detailed description of the LTE random access procedure can be also found in 3GPP TS 36.321, section 5.1. v14.1.0.

In the following the LTE contention-based random access procedure is being described in more detail with respect to FIG. 4. This procedure consists of four "steps". First, the user equipment transmits a random access preamble on the Physical Random Access Channel (PRACH) to the eNodeB (e.g., message 1 of the RACH procedure). After the eNodeB has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions, an initial uplink resource assignment (grant) for the transmission of the first scheduled transmission and an assignment of a Temporary Cell Radio Network Temporary Identifier (T-CRNTI). This T-CRNTI is used by eNodeB to address the mobile(s) whose RACH preamble was detected until the RACH procedure is finished, since the "real" identity of the mobile at this point is not yet known by the eNodeB.

The user equipment monitors the PDCCH for reception of the random access response message within a given time window, which is configured by the eNodeB. In response to the RAR message received from the eNodeB, the user equipment transmits the first scheduled uplink transmission on the radio resources assigned by the grant within the random access response. This scheduled uplink transmission conveys the actual random access procedure message like for example an RRC connection request, RRC Resume Request or a buffer status report.

In case of a preamble collision having occurred in the first message of the RACH procedure, e.g., multiple user equipment have sent the same preamble on the same PRACH resource, the colliding user equipment will receive the same T-CRNTI within the random access response and will also collide in the same uplink resources when transmitting their scheduled transmission in the third step of the RACH procedure. In case the scheduled transmission from one user equipment is successfully decoded by eNodeB, the contention remains unsolved for the other user equipment(s). For resolution of this type of contention, the eNode B sends a contention resolution message (a fourth message) addressed to the C-RNTI or Temporary C-RNTI. This concludes the procedure.

FIG. 5 is illustrating the contention-free random access procedure of 3GPP LTE, which is simplified in comparison to the contention-based random access procedure. The eNodeB provides in a first step the user equipment with the preamble to use for random access so that there is no risk of collisions, e.g., multiple user equipment transmitting the same preamble. Accordingly, the user equipment is subsequently sending the preamble which was signaled by eNodeB in the uplink on a PRACH resource. Since the case that multiple UEs are sending the same preamble is avoided for a contention-free random access, essentially, a contention-free random access procedure is finished after having successfully received the random access response by the UE.

Thus, a similar or same RACH procedure as just explained in connection with FIGS. 4 and 5 could be adopted in the future for the new radio technology of 5G. However, 3GPP is also studying a two-step RACH procedure for 5G NR, where a message 1, that corresponds to messages 1 and 3 in the four-step RACH procedure, is transmitted at first. Then, the gNB will respond with a message 2, corresponding to messages 2 and 4 of the LTE RACH procedure. Due to the reduced message exchange, the latency of the two-step RACH procedure may be reduced compared to the four-step RACH procedure. The radio resources for the messages are optionally configured by the network.

Paging Procedures in 5G NR

Although paging is not yet finally decided in 5G, it is assumed that there will be two different paging procedures in 5G NR, a RAN-based paging procedure and a core-network-based paging procedure, see for instance 3GPP TS 38.300 v15.0.0 referring to RAN paging and CN paging in several sections thereof. The RRC in NR 5G, as currently defined in section 5.5.2 of TR 38.804 v14.0.0, supports the following three states, RRC Idle, RRC Inactive, and RRC Connected. A new RRC state, inactive, is defined for the new radio technology of 5G, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signaling, power saving, latency, etc. A user equipment in RRC Inactive state may support small uplink data transmissions without necessarily performing a full state transition to the RRC connected state.

For the UE in RRC Inactive state the connection (both for user plane and control plane) may be maintained with RAN and the core network. In addition, the paging mechanism (may also be called notification mechanism) for user equipment in said inactive state is based on so called radio access network, RAN-based notification areas (in short RNAs). The radio access network should be aware of the current RNA the user equipment is located in, and the user equipment may assist the gNB to track the UE moving among various RNAs. The RNA can be UE specific. A RNA can cover a single or multiple cells. It can be smaller than the core network area, used for tracking a UE in RRC idle state.

For instance, paging the UE might be necessary in order to be able to provide downlink data to the UE. The downlink data may refer to a particular network slice (see below for details) supported by the UE, and in order for the UE to be able to properly connect and setup the connection and service, information on the network slice is necessary in the RAN as well as in the core network of the communication system.

Network Slicing

As mentioned in the background section, network slicing may be a key concept to meet the diverse requirements of 5G NR.

Network Slicing in itself is not new, since LTE Rel-13 defined a similar concept that got adopted which was Dedicated Core (DECOR). Dedicated core principles allow the core network to be divided for the purpose of delivering unique services. DECOR got further evolved into eDECOR where a UE could provide its Dedicated Core Network (DCN) ID that allows an eNB to select the suitable dedicated core network elements at the first instance itself. This feature distinguishes eDECOR from DECOR and allows to cut down core signaling. Dedicated Core Networks are, e.g., described in 3GPP TS 23.401 v15.2.0, section 4.3.25. Accordingly, a UE will include DCN-ID in RRCConnectionSetupComplete as described in TS 36.300 v15.0.0 (with regard to the NAS Node Selection Function (NNSF) in section 19.2.1.7) and TS 36.331 v15.0.1 (e.g., with regard to the RRCConnectionSetup, section 5.3.3.4).

In 3GPP DCN-ID is defined to identify a specific dedicate core network (DCN). When DCNs are used, the MME Load Balancing function is only performed between MMEs that belong to the same DCN. The MME Load Balancing for DCN is described in TS 23.401 v 15.2.0, section 4.3.72.

The main difference between slicing and eDECOR is that in slicing partitioning of resources is end-to-end, meaning that it also involves radio network resources in addition to core network resources, whereas in DECOR partitioning of resources applies to the core network only.

With eDECOR, it was thought that a UE can support at most one Service type. Hence, inclusion of DCN-ID is not an issue from efficiency perspectives. On the other hand, 3GPP decided in RAN2 #99 that a UE can support up to 8 network slices simultaneously, and that the UE can be configured to support the requirements of the supported slices, e.g., by appropriately configuring different Dedicated Radio Bearers (DRBs) of different PDU sessions.

But given that 3GPP decided in RAN2 #99 that a UE can support 8 network slices simultaneously and given the fact that 3GPP SA2 defined S-NSSAI can take at most 32 bits, a lot of bits would need to be used and exchanged on the air interface.

Network slicing is also generally defined in 3GPP TS 23.501 v15.0.0, e.g., sections 5.15, 5.18.5. According to TS 23.501, S-NSSAI (Single Network Slice Selection Assistance Information) identifies a network slice and is comprised of:

a Slice/Service type (SST), which refers to the expected Network Slice behavior in terms of features and services; and
  a Slice Differentiator (SD), which is optional information that complements the Slice/Service type(s) to differentiate amongst multiple Network Slices of the same Slice/Service type.

An S-NSSAI can have standard values or non-standard values. S-NSSAIs with PLMN-specific values are associated to the PLMN ID of the PLMN that assigns it. An S-NSSAI shall not be used by the UE in access stratum procedures in any PLMN other than the one to which the S-NSSAI is associated.

The NSSAI is a collection of S-NSSAIs. There can be at most 8 S-NSSAIs in the NSSAI sent in signaling messages between the UE and the Network. Each S-NSSAI assists the network in selecting a particular Network Slice instance.

The same Network Slice instance may be selected by means of different S-NSSAIs.

Based on the operator's operational or deployment needs, a Network Slice instance can correspond to one or more S-NSSAIs, or multiple Network Slice instances of an S-NSSAI may be deployed in the same or in different Tracking Areas. When multiple Network Slice instances of an S-NSSAI are deployed in the same Tracking Areas, the AMF instance serving the UE may logically belong to more than one Network Slice instance of that S-NSSAI, e.g., this AMF instance may be common to multiple Network Slice instances of that S-NSSAI. When a S-NSSAI is supported by more than one Network Slice instance in a PLMN, any of the Network Slice instances supporting the same S-NSSAI in a certain area may, as a result of the Network Slice instance selection procedure defined in clause 5.15.5, serve a UE that is allowed to use this S-NSSAI. Upon association with an S-NSSAI, the UE is served by the same Network Slice instance for that S-NSSAI until cases occur where, e.g., Network Slice instance is no longer valid in a given registration area, or a change in UE's Allowed NSSAI occurs, etc. In such cases, procedures mentioned in clause 5.15.5.2.2 or clause 5.15.5.2.3 applies.

The 5GC is responsible for selection of a Network Slice instance(s) to serve a UE and the 5GC Control Plane and user plane Network Functions corresponding to the Network Slice instance.

The (R)AN may use Requested NSSAI in access stratum signaling to handle the UE Control Plane connection before the 5GC informs the (R)AN of the Allowed NSSAI. The Requested NSSAI is not used by the RAN for routing when the UE provides a 5G-GUTI.

When a UE is successfully registered, the CN informs the (R)AN by providing the whole Allowed NSSAI.

Some agreements relating to network slicing in 5G NR can be currently found in 3GPP TS 38.300 v15.0.0 section 16.3.

A network slice may consist of a RAN part and a CN part that may identify different resources respectively. The support of network slicing relies on the principle that traffic for different slices is handled by different PDU sessions. Network can realize the different network slices by scheduling and also by providing different L1/L2 configurations. The UE provides assistance information for network slice selection in RRC message, if it has been provided by NAS. While the network can support large number of slices (e.g., hundreds), the UE need not support more than 8 slices simultaneously.

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions. A UE has an SLA that governs as to what network slices and network slice types a UE has subscribed to, which can be stored in the 5G core network, e.g., in the HSS (Home Subscriber Server).

Slightly varying definitions can be found in the various technical specifications available in 3GPP in said respect. For instance, according to TS 23.501, a network slice is a logical network that provides specific network capabilities and network characteristics, and a network slice instance is a set of network function instances and the required resources (e.g., computer, storage, and network resources) which form a deployed network slice. TS 38.801 defines a network slice as a network created by the operator and customized to prove an optimized solution for a specific market scenario which demands specific requirements with end-to-end scope.

Each network slice is uniquely identified by a S-NSSAI, as defined in 3GPP TS 23.501 mentioned above. NSSAI (Network Slice Selection Assistance Information) includes one or more S-NSSAIs (Single NSSAI).

The following key principles apply for support of Network Slicing in NG-RAN:

RAN Awareness of Slices
NG-RAN supports a differentiated handling of traffic for different network slices which have been pre-configured. How NG-RAN supports the slice enabling in terms of NG-RAN functions (e.g., the set of network functions that comprise each slice) is implementation dependent.
Selection of RAN Part of the Network Slice
NG-RAN supports the selection of the RAN part of the network slice, by assistance information provided by the UE or the 5GC which unambiguously identifies one or more of the pre-configured network slices in the PLMN.

Resource Management Between Slices
NG-RAN supports policy enforcement between slices as per service level agreements. It should be possible for a single NG-RAN node to support multiple slices. The NG-RAN should be free to apply the best RRM policy for the SLA in place to each supported slice.
Support of QoS
NG-RAN supports QoS differentiation within a slice.
RAN Selection of CN Entity
For initial attach, the UE may provide assistance information to support the selection of an AMF. If available, NG-RAN uses this information for routing the initial NAS to an AMF. If the NG-RAN is unable to select an AMF using this information or the UE does not provide any such information the NG-RAN sends the NAS signaling to a default AMF.
For subsequent accesses, the UE provides a Temp ID, which is assigned to the UE by the 5GC, to enable the NG-RAN to route the NAS message to the appropriate AMF as long as the Temp ID is valid (NG-RAN is aware of and can reach the AMF which is associated with the Temp ID). Otherwise, the methods for initial attach applies.
Resource Isolation Between Slices
the NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.
Slice Availability
Some slices may be available only in part of the network. Awareness in the NG-RAN of the slices supported in the cells of its neighbors may be beneficial for inter-frequency mobility in connected mode. It is assumed that the slice availability does not change within the UE's registration area.
The NG-RAN and the 5GC are responsible to handle a service request for a slice that may or may not be available in a given area. Admission or rejection of access to a slice may depend by factors such as support for the slice, availability of resources, support of the requested service by NG-RAN.
Support for UE Associating with Multiple Network Slices Simultaneously
In case a UE is associated with multiple slices simultaneously, only one signaling connection is maintained and for intra-frequency cell reselection, the UE always tries to camp on the best cell. For inter-frequency cell reselection, dedicated priorities can be used to control the frequency on which the UE camps.
Granularity of Slice Awareness
Slice awareness in NG-RAN is introduced at PDU session level, by indicating the S-NSSAI corresponding to the PDU Session, in all signaling containing PDU session resource information.
Validation of the UE Rights to Access a Network Slice
It is the responsibility of the 5GC to validate that the UE has the rights to access a network slice. Prior to receiving the Initial Context Setup Request message, the NG-RAN may be allowed to apply some provisional/local policies, based on awareness of which slice the UE is requesting access to. During the initial context setup, the NG-RAN is informed of the slice for which resources are being requested.

There are and will be further agreements during 3GPP meetings and discussions further developing the network slicing functionality for 5G NR. Although some initial agreements and assumptions have been made with regard to extending the network slicing into the RAN, no detailed solutions are yet available nor suggested in said respect. There is thus a need to provide improved procedures on how network slicing in RAN can be implemented. This may include an improved paging procedure as well as an improved connection or resume procedure involving the use of a shortened AS-specific network slice ID.

For instance, there is a need for the UE to indicate to a gNB those Slice IDs that a UE is interested in for NAS Node Selection function to work. The gNB will correspondingly be able to determine which core network elements to connect for a given UE connection and service request.

Moreover, UE support of 8 simultaneous network slices may lead to the situation that the UE needs to convey 8 network slice IDs (currently the S-NSSAI) to the gNB, each network slice ID possibly being 32 bits long, thus 256 bits in total. This is disadvantageous since it wastes the scarce resources on the air interface.

DETAILED DESCRIPTION OF PRESENT DISCLOSURE

In the following, UEs, base stations, and procedures to meet these needs will be described for the new radio access technology envisioned for the 5G mobile communication systems. Different implementations and variants will be explained as well. The following detailed disclosure was facilitated by the discussions and findings as described in the previous section "Basis of the present disclosure" and may for example be based at least on part thereof.

In general, it should be however noted that only few things have been actually agreed on with regard to the 5G cellular communication system such that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current study items for 3GPP 5G, even though specific terminology to be used in the context of the new radio access technology for the next 3GPP 5G communication systems is not fully decided yet. Thus, terms could be changed in the 3GPP normative phase, without affecting the functioning of the embodiments of the disclosure. Consequently, a skilled person is aware that the disclosure and its scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

The term "network slice" refers to the idea of how to partition network resources so as to facilitate a provision of different services with different characteristics and requirements. Slightly different definitions have been provided by different 3GPP groups, as mentioned in the Basis of the present disclosure section above. Correspondingly, a network slice can be broadly understood as logical network that provides specific network capabilities and characteristics.

Figure 6:
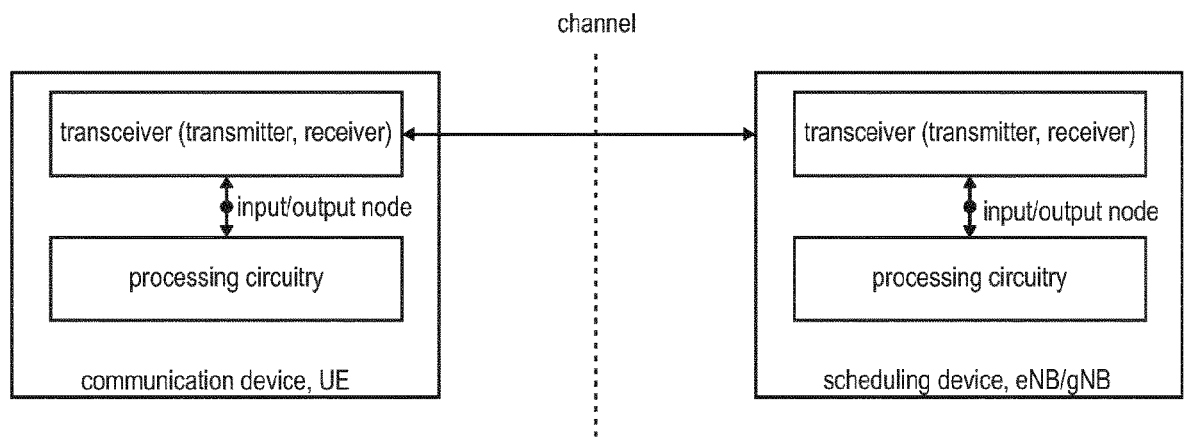
FIG. 6 illustrates the exemplary and simplified structure of a UE and an eNB.

FIG. 6 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, e.g., control the receiver and/or the transmitter and exchange reception/transmission data. The transceiver may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data which is further processed by the processing circuitry. The processing circuitry may also be responsible for performing processes of determining, deciding, calculating, measuring, etc. The transmitter may be responsible for performing the process of transmitting and other processes related thereto. The receiver may be responsible for performing the process of receiving and other processes related thereto.

In the present case as will become apparent from the below description of the different embodiments and variants thereof, the processor can thus be exemplarily configured to determine network slices and corresponding identification information, such as the shortened and full network slice IDs. Another example refers to the transmitter being in turn configured to be able to transmit the messages of the RACH procedure. Conversely, a receiver can in turn be configured to be able to receive messages of the RACH procedure as well as paging messages from the base stations.

Figure 7:
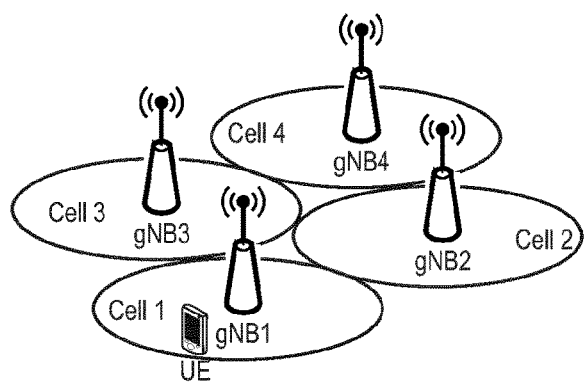
FIG. 7 illustrates a simple scenario with a UE being connected to a gNB1, and having neighboring cells respectively controlled by different gNBs.

A simple and exemplary scenario is assumed in the following. As illustrated in FIG. 7 it is assumed that a UE is located in the coverage area of radio cell 1, which is controlled by gNB1. There are neighboring radio cells 2, 3, and 4 respectively controlled by gNB2, gNB3, and gNB4.

Embodiment 1

An improved paging procedure will be described in the following according to numerous variants of a first embodiment so as to allow the UE to determine to which network slice the paging actually pertains. The information on the network slice is important to the UE since it allows the UE to include corresponding information in messages (e.g., destined to the gNB and/or to the core network) needed to appropriately respond to the paging (e.g., setting up or resuming a connection and service).

In brief, the gNB is responsible for transmitting the paging message to the UE in such a manner that the UE can derive therefrom for which network slice the paging is transmitted. There are several possibilities on how the paging message transmitted from the gNB to the UE can allow the UE to determine the network slice for which the paging is intended. Generally, the corresponding identification information of the network slice can be encoded explicitly or implicitly with the paging message as will be explained in the following.

For instance, explicit identification information of the network slice can be included into the paging message, e.g., as part of the paging record, which is transmitted from the gNB to the UE. The paging message currently being used in LTE as defined in 3GPP TS 36.331 v15.0.1 section 6.2.2 (see also section 5.3.2). With regard to 5G NR no definite paging message is defined yet, thus exemplarily assuming the paging message currently employed in LTE for further discussion. As apparent from the above cited 36.331, in LTE a paging message may include up to 16 paging records, each of which specifies the UE which is being paged within the paging message.

The paging record of the paging message may be extended as follows to additionally convey the network slice ID (in this case exemplary case the S-NSSAI, bold and underlined below):

```
PagingRecord ::= SEQUENCE {
    ue-Identity        PagingUE-Identity,
    cn-Domain          ENUMERATED       {ps, cs},
    S-NSSAI                             BIT STRING(SIZE(32)),
    ...
}
```

Alternatively, instead of providing the explicit identification information in the paging record, another possible solution allows providing same in the PDCCH (DCI) which accompanies the paging message. Although no final agreements have been reached for 5G NR in said respect, it can be assumed that paging is performed similar to LTE where paging is performed based on a PDCCH (DCI) with the CRC being scrambled by the P-RNTI (for LTE paging, see, e.g., TS 36.213 v14.5.0 section 7.1 and TS 36.304 v14.5.0 section 7). The actual paging message with the paging record is transmitted on the PDSCH, as indicated by the PDCCH DCI. As apparent from LTE, "P-RNTI transmitted on PDCCH" is for normal LTE; "P-RNTI transmitted on MPDCCH" is for eMTC; "P-RNTI transmitted on NPDCCH" is for NB-IoT. Exemplarily for 5G NR, eMBB could use normal PDCCH; mMTC could use separate PDCCH; URLLC, the same as eMBB or separate PDCCH could be used depending on future discussions. Correspondingly, the PDCCH DCI format can be extended to also carry the network slice ID.

Instead of using an explicit signaling of the identification information, other solutions provide an implicit indication of the identification information, e.g., using the transmission parameters used for transmitting the paging message, to distinguish between different network slices, thus allowing the UE to identify the network slice intended by the paging.

There are several transmission parameters that can be used in said respect, such as the time (e.g., subframe, or radio frame) at which the paging message is transmitted, or the frequency (e.g., frequency subband) at which the paging message is transmitted, or the OFDM numerology (characterized, e.g., by its subcarrier spacing) used for transmitting the paging message. There will be a common understanding between the UE and the gNB, as to which transmission parameter or combination of transmission parameters encodes which network slice, such that the gNB can determine the transmission parameter(s) from the intended network slice and then the UE can derive from the used transmission parameter(s) of the paging transmission as to which network slice the paging is intended for. An implicit signaling of the network slice is advantageous in that it does not waste radio resources on the air interface, for instance needed to convey the explicit identification information from the gNB to the UE.

One example of how to differentiate different network slices based on the frequency at which the paging message is transmitted. Different network slices can be different between each other with regard to the frequency they employ for data reception and transmission; these network slices can be termed exemplarily inter-frequency network slices. Consequently, each network slice could be differentiated unambiguously by its employed frequency, and by transmitting the paging message at the frequency of the network slice it is intended for, the UE is able to unambiguously derive the network slice from the frequency used for the paging message transmission.

This frequency-based unambiguous identification is no longer possible when different network slices employ the same frequency for data reception and transmission; such network slices can be termed exemplarily intra-frequency network slices. Intra-frequency network slices then would need to be identified by the UE differently, e.g., based on another transmission parameter (such as the time of the paging), differing between the intra-frequency network slices or based on explicit identification information included in the paging message by the gNB. Then, an unambiguous identification of the intended network slice for the paging is again possible.

Moreover, the various solutions to explicitly or implicitly signal the identification information of the network slice (see above) could also be combined in any suitable manner. For instance, one part of the identification information may be encoded explicitly into the paging message (e.g., into the paging record or the DCI accompanying the paging message) while another part of the identification information is encoded implicitly into the paging message (e.g., by using a specific frequency to transmit the paging message).

In any case, the UE can determine for which network slice the paging message is intended for based on the received paging message. This information can be then used for setting up the connection and the service with the gNB and core network, as will be exemplarily explained in the following.

Although the above explanations only consider one network slice, the variants of Embodiment 1 explained above and below are also applicable for a case where the paging message pertains to more than one network slice at the same time. In said case for instance the gNB encodes explicitly and/or implicitly the identification information for the various network slices, and correspondingly the UE identifies the various network slices to which the paging pertains based on the received paging message.

The above explanations have focused mainly on the paging occurring between the UE and the gNB, without taking into account whether the paging is initiated by the gNB (RAN-based paging) or a core network entity (such as the AMF) (core-network-based paging). To begin with, Embodiment 1 is applicable to both RAN-based paging and core-network-based paging.

The general characteristics of RAN-based paging and core-network-based paging have been explained before. Specifically, RAN-based paging is initiated within the radio access network and is transparent to the core network, e.g., the core network assumes that the UE is still in connected mode. Thus for instance, if downlink data is forwarded from the core network to the gNB responsible for the UE, the UE needs to be paged according to RAN-based paging in the paging area. Consequently, all the gNBs within a UE-specific RAN Notification area (in which an INACTIVE state UE can roam without having to trigger an update) (or at least those gNBs in the paging area actually supporting the network slice) shall transmit a suitable paging message in order to reach the UE.

The gNB receiving the downlink data from the core network (e.g., the serving gateway) determines to which one or more network slices the downlink data refers. The gNB determines corresponding identification information for the one or more network slices and forwards same to the other gNBs in the RAN notification area, such that the other gNBs in turn can provide this identification information to the UE during paging (e.g., according to any of the above-discussed explicit and/or implicit solutions). The gNB can communicate with other gNBs over the Xn interface, and in one example the corresponding message for RAN-based paging between the gNBs can be extended with the necessary identification information.

Core Network-based paging has been explained in detail before and can be initiated by the AMF (Access and Mobility management Function) which transmits a UE-specific paging request message on the N2 interface to the gNB. An example of such a paging request message is currently defined in TS 38.413 v0.5.0 in section 8.5 thereof which might be based on TS 36.413 v14.4.0, section 8.5, and could for instance be extended as follows (see bold and underlined last line of table):

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |
| Assistance Data for Paging | O | | 9.2.1.103 | | YES | ignore |
| Paging eDRX Information | O | | 9.2.1.111 | | YES | ignore |
| Extended UE Identity Index Value | O | | 9.2.3.46 | | YES | ignore |
| NB-IoT Paging eDRX Information | O | | 9.2.1.115 | | YES | ignore |
| NB-IoT UE Identity Index value | O | | 9.2.3.47 | | YES | ignore |
| Slice Information | O | — | — | — | YES | ignore |

The information element "Slice Information" can include, e.g., the one or more network slice IDs, such as the S-NSSAI introduced before.

In the solutions explained so far it has been assumed that the identification information on the network slices is the S-NSSAI with a size of 32 bits. On the other hand, the numerous variants of Embodiment 2 introduce a shortened network slice ID with far fewer bits so as to avoid an excessive overhead on the air interface. Embodiment 1 and Embodiment 2 can be combined such that the improved paging procedure of Embodiment 1—in so far as possible— uses the shortened network slice ID instead of the full network slice ID (e.g., S-NSSAI).

For instance, assuming the same example of an extended paging message as before, the paging record of the paging message can be extended with the shortened network slice ID (here termed exemplarily AS-Slice ID) as follows:

```
PagingRecord ::= SEQUENCE {
  ue-Identity      PagingUE-Identity,
  en-Domain        ENUMERATED          {ps, cs},
    AS-Slice ID                    BIT STRING(SIZE(x)),
  ...
}
```

Using a shortened network slice ID, instead of the full network slice ID, allows to facilitate the explicit and implicit signaling of the network slice intended for paging, since far fewer network slices need to be distinguished based on the paging message transmission. Less elaborate implicit encoding through the transmission parameters is required, and/or fewer bits need to be included in the paging message or PDCCH DCI for the explicit signaling solutions.

On the other hand, in those messages that are exchanged between the gNBs the full network slice ID (e.g., S-NSSAI) can be used instead of the shortened slice ID, since the exchange occurs via the backbone and since other gNBs might not be aware of the mapping between the shortened network slice IDs and the actual network slices that can be gNB specific for instance. Otherwise, it might become necessary to provide these mappings to other gNBs so as to be able to use shortened network slice IDs in said respect.

Figure 8:
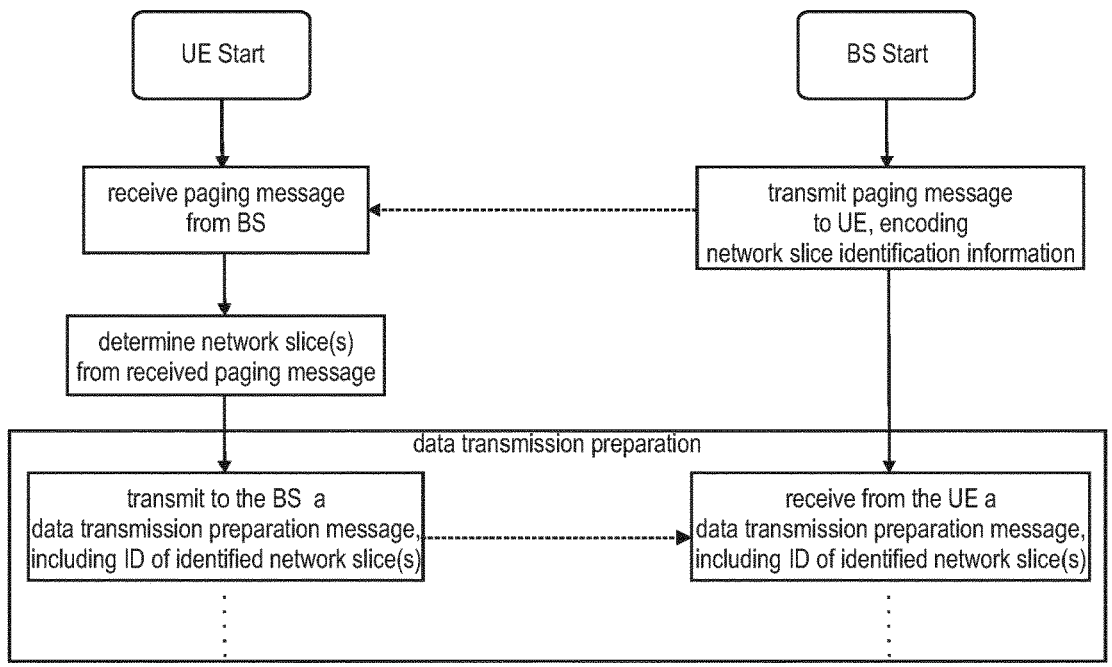
FIG. 8 is a sequence diagram of the UE and base station behavior according to one variant of the first embodiment.

Embodiment 1 accordingly provides suitable configured gNB(s) (base station) and UEs that can carry out the improved paging procedure according to any of the various implementations discussed above. The base station and UEs can contain units as exemplified in FIG. 6 to perform the tasks and steps necessary to participate in Embodiment 1. FIG. 8 illustrates the behavior of the gNB (BS) as well as the UE according to an exemplary basic variant of Embodiment 1. In said respect, the base station (e.g., a transmitter thereof) operates to transmit a paging message to the UE, which encodes (e.g., implicitly and/or explicitly) identification information of the network slice for which the paging is intended. In turn, the UE (e.g., a receiver thereof) operates to receive the paging message from the base station. Subsequently, the UE (e.g., a processor thereof) can determine the network slice to which the paging message pertains. In correspondence to the encoding of the identification information by the BS, the UE can determine based on explicit or implicit information the network slice for which the paging is intended.

It is exemplarily assumed that the paging by the base station was occasioned by downlink data destined to the UE. According to this exemplary variant of the embodiment illustrated in FIG. 8, the information on the network slice is then used for a data transmission preparation so as to prepare the necessary connection and services to allow said downlink data transmission between the base station and the UE. This may include for instance that the UE transmits a data transmission preparation message to the base station, including identification information of the network slices previously determined. This data transmission preparation procedure may involve further steps to finally establish the necessary AS and NAS connections and services, wherein these steps however are omitted from FIG. 8 and the present explanation since they are less important to Embodiment 1.

Figure 9:
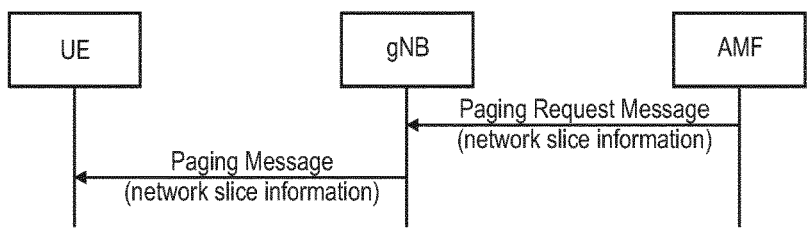
FIG. 9 is a message diagram for an improved paging procedure according to one variant of the first embodiment.

FIG. 9 is a high-level message-exchange diagram according to one variant of Embodiment 1, based on core-network-based paging, illustrating the transmission of a paging request message that conveys information on the network slice for which it is intended. Correspondingly, a paging message is transmitted from the gNB to the UE also conveying the network slice identification information.

Figure 10:
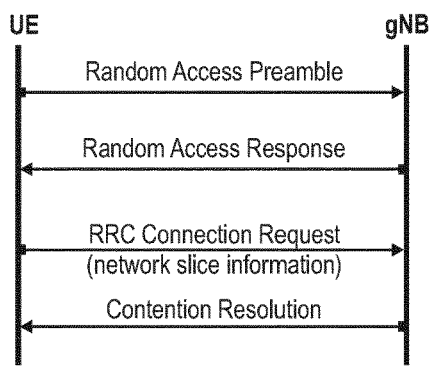
FIGS. 10 and 11 are message diagrams for an improved RACH procedure according to different variants of the first embodiment.
Figure 11:
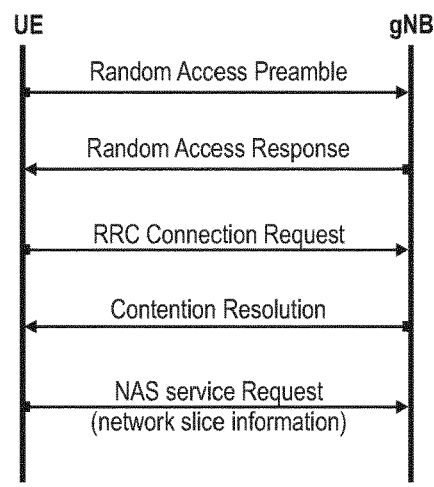

Moreover, FIGS. 10 and 11 disclose variants of the data transmission preparation message discussed above in connection with FIG. 8. Particularly, the data transmission preparation message, used to transmit network slice identification information, can be the $3^{rd}$ message of the RACH procedure, in FIG. 10 exemplarily the RRCConnectionRequest message, or a service request message (NAS service request message of FIG. 11).

According to a different further solution, the gNB is able to store an association between the UE that is being paged and the corresponding network slice to which the paging pertains. For instance, assuming that the paging is destined to a UE which is in INACTIVE STATE, a gNB can identify a UE using I-RNTI (which can be equivalent to Rel-14 Resume Identifier). The gNB can thus associate the I-RNTI of the UE with the network slice of the paging, and thus there is no need to page the UE with a network slice ID as discussed above. Rather, the gNB stores the association between the I-RNTI and the network slice, and when the UE sends the connection or resume request, the gNB can determine the suitable core entities based on the stored association.

Embodiment 2

An improved identification of the network slices will be described in the following according to numerous variants of a second embodiment. The improved identification provides benefits, e.g., for the connection, resume and service request procedures performed by the UE over the air interface. As explained before, network slicing in 5G NR is supposed to be divided into RAN slices and core network slices, unambiguously associated with each other. A network slice ID (e.g., the S-NSSAI) can unambiguously identify any of the defined RAN and CN (Core Network) slices.

The UE may support up to 8 different RAN network slices simultaneously and thus may have to correspondingly identify each of the RAN network slices to the gNB.

Embodiment 2 introduces a new shortened network slice ID, in contrast to the full network slice ID (e.g., the S-NSSAI). Providing a shortened network slice ID according to one of the variants of Embodiment 2 allows to reduce significantly the data overhead on the air interface. This shortened network slice ID can be primarily used in the access stratum (AS), e.g., in the radio access network (RAN), and thus be termed exemplarily AS slice ID in the following. The bit length of the new AS slice ID is shortened compared to the full network slice ID, and the shorter the bit length of the AS slice ID is, the more beneficial it is with regard to how much radio resources on the air interface can be saved by using the shortened network slice ID instead of the full network slice ID.

At present it is discussed that the S-NSSAI may comprise 32 bits, which amounts to a possible number of different (RAN and CN) network slices of $2^{32}$=4.294.967.296, e.g., over 4 million possible network slices (or network slice instances). Hundreds or thousands of the possible network slices may be supported within one PLMN, but significantly less will have to be supported within a radio cell at the same time. Even less network slices are concurrently supported for each UE, e.g., presently at most 8 network slices, but regularly it may be expected that a UE will support only 2 or 3 different network slices at the same time. Moreover, radio cells in the future may become smaller in size due to capacity reasons and hence might have to support fewer network slices or network slice types. The less different network slices need to be actually distinguished, the smaller the shortened network slice ID needs to be in order to be able to distinguish them. The shortened network slice ID is unambiguously to a respective full network slice ID and its network slice. The short-to-full slice ID mapping can be specific to the radio cell, e.g., the short-to-full slice ID mapping is valid within one radio cell but may differ between different radio cells. Alternatively or additionally, the short-to-full slice ID mapping can also be specific to a UE, e.g., that it is only valid for a specific UE (or group of UEs) but may differ between different UEs. There could also be a mix of the two, such that some of the network slices (with corresponding full network slice ID) are mapped to shortened network slice IDs which are radio-cell-specific, and other network slices (with corresponding full network slice ID) are mapped to shortened network slice IDs which are UE specific.

To simplify the following explanation of some of the basic ideas of the numerous variants of Embodiment 2, it is exemplarily assumed that the short-to-full slice ID mapping is radio-cell-specific.

This mapping between the AS slice ID and the full network slice ID can be defined, e.g., by the gNB controlling the radio cell, the gNB being the entity that is aware of the UEs in the radio cell and thus can decide as to how many and which network slices need to be concurrently supported within the radio cell. Based on this information, the gNB can define the AS slice IDs and the corresponding mapping to the full network slice ID (e.g., the actual network slice).

One possible example for defining the shortened AS Slice ID is to use part of the full network slice ID, e.g., the 4 least significant bits thereof.

After having defined the necessary AS slice IDs and the corresponding mapping, the gNB can inform the UEs in its radio cell about same. The gNB is thus responsible for informing the necessary entities about the AS slice ID and the corresponding mapping to the full network slice ID.

The necessary information about the newly-defined AS slice IDs and their mapping to the full network slice IDs can be provided to the UEs in the radio cell of the gNB in different manners. For instance, the information may be broadcast by the gNB as system information in the radio cell. According to one exemplary implementation, system information Block 1 (SIB 1) can be used in said respect, and can be extended to comprise said information, for instance as follows (see bold and underlined):

In the above definition "Size(x)" x shall indicate the size of the shortened AS Slice ID, e.g., 3 bits, whereas the S-NSSAI has a size of 32 bits.

A further option to provide the necessary AS slice ID and corresponding mapping information to the UE(s) in the radio cell, may be as system information on demand. In 5G NR it is currently envisioned (although not finally agreed upon) that system information is generally divided into minimum system information and other system information. The minimum system information is periodically broadcast and comprises basic information required for initial access to a cell (such as System Frame Number, list of PLMN, Cell ID, cell camping parameters, RACH parameters). The minimum system information may further comprise information for acquiring any other SI broadcast periodically or provisioned via on-demand basis, e.g., suitable scheduling information in said respect. The scheduling information may for instance include as necessary the SIB type, validity information, SI periodicity and SI-window information. Correspondingly, the other system information shall encompass everything that is not broadcast in the minimum system information, e.g., cell-reselection neighboring cell information. The other SI may either be broadcast or provisioned in a dedicated manner, either triggered by the network or upon request from the UE.

Correspondingly, the AS slice ID and corresponding mapping information could be transmitted in the minimum system information (e.g., in SIB1) or as part of the other system information, provisioned via on-demand basis.

According to a further option, the AS slice ID and corresponding mapping information could be transmitted directly to the UE via dedicated signaling, e.g., signaling of the RRC layer such as an RRC Connection Release message. Such dedicated signaling is addressed only to a specific UE instead of to all UEs in a radio cell, and is thus best suited for a case where the AS slice ID and corresponding mapping information is UE specific.

An example of a modified RRC Connection Release message is presented below, specifically the parts in bold and underlined.

```
SystemInformationBlockType1-NR-v15## ::=    SEQUENCE {
    SliceMappingList-v15##        SliceMapInfo-r15       OPTIONAL, -Need OR
    nonCriticalExtension          SEQUENCE { }           OPTIONAL
}
SliceMapInfo-r15 ::= SEQUENCE {
    carrierFreq-r15               ARFCN-ValueEUTRA-NR-r15,    OPTIONAL
    AB-Slice-ID                   BIT STRING(SIZE(x)),
    S-NSSAI                       BIT STRING(SIZE(32))
}
```

| RRCConnectionRelease message |
|---|

```
-- ASN1START
RRCConnectionRelease ::=            SEQUENCE {
    rrc-TransactionIdentifier           RRC-TransactionIdentifier,
    criticalExtensions                  CHOICE {
        c1                                      CHOICE {
            rrcConnectionRelease-r8                 RRCConnectionRelease-
r8-IEs,
            spare3 NULL, spare2 NULL, spare1 NULL
        },
        criticalExtensionsFuture            SEQUENCE { }
    }
}
RRCConnectionRelease-r8-IEs ::=     SEQUENCE {
    releaseCause                        ReleaseCause,
    redirectedCarrierInfo               RedirectedCarrierInfo
        OPTIONAL,   -- Need ON
    idleModeMobilityControlInfo         IdleModeMobilityControlInfo
        OPTIONAL,   -- Need OP
    nonCriticalExtension                RRCConnectionRelease-v890-IEs
        OPTIONAL
}
RRCConnectionRelease-v890-IEs ::=   SEQUENCE {
    lateNonCriticalExtension            OCTET STRING (CONTAINING
RRCConnectionRelease-v9e0-IEs) OPTIONAL,
    nonCriticalExtension                RRCConnectionRelease-v920-IEs
        OPTIONAL
}
-- Late non critical extensions
RRCConnectionRelease-v9e0-IEs ::=   SEQUENCE {
    redirectedCarrierInfo-v9e0              RedirectedCarrierInfo-v9e0
        OPTIONAL,   -- Cond NoRedirect-r8
    idleModeMobilityControlInfo-v9e0    dleModeMobilityControlInfo-v9e0
        OPTIONAL,   -- Cond IdleInfoEUTRA   OPTIONAL,
    nonCriticalExtension                    SEQUENCE { }
        OPTIONAL
}
-- Regular non critical extensions
RRCConnectionRelease-v920-IEs ::=   SEQUENCE {
    cellInfoList-r9                     CHOICE {
        geran-r9                            CellInfoListGERAN-r9,
        utra-FDD-r9                             CellInfoListUTRA-FDD-r9,
        utra-TDD-r9                             CellInfoListUTRA-TDD-r9,
        ...,
        utra-TDD-r10                    CellInfoListUTRA-TDD-r10
    }
        OPTIONAL,       -- Cond Redirection
    nonCriticalExtension        RRCConnectionRelease-v1020-IEs
        OPTIONAL
}
RRCConnectionRelease-v1020-IEs ::=  SEQUENCE {
    extendedWaitTime-r10                INTEGER (1..1800)
        OPTIONAL,   -- Need ON
    nonCriticalExtension        RRCConnectionRelease-v1320-IEs
        OPTIONAL
}
RRCConnectionRelease-v1320-IEs::=   SEQUENCE {
    resumeIdentity-r13                  ResumeIdentity-r13
        OPTIONAL,   -- Need OR
    nonCriticalExtension                RRCConnectionRelease-v1520-IEs
        OPTIONAL
}
RRCConnectionRelease-v1520-IEs::=   SEQUENCE {
    neighSliceMapInfoList-r9                    CHOICE {
        eutra-FDD-r15                       CellSliceMapInfoListEUTRA-FDD-r15,
        eutra-TDD-r15                       CellSliceMapInfoListEUTRA-TDD-r15,
        ...,
        nr-FDD-r15                          CellSliceMapInfoListNR-FDD-r15
        nr-TDD-r15                          CellSliceMapInfoListNR-TDD-r15
    }       OPTIONAL,
    nonCriticalExtension                SEQUENCE { }
        OPTIONAL
}
ReleaseCause ::=        ENUMERATED {loadBalancingTAUrequired,
                                                other, cs-
FallbackHighPriority-v1020, rrc-Suspend-v1320}
RedirectedCarrierInfo ::=       CHOICE {
    eutra                               ARFCN-ValueEUTRA,
    geran                               CarrierFreqsGERAN,
    utra-FDD                            ARFCN-ValueUTRA,
```

| RRCConnectionRelease message |
|---|
| ```
utra-TDD                                     ARFCN-ValueUTRA,
cdma2000-HRPD                                CarrierFreqCDMA2000,
cdma2000-1xRTT                               CarrierFreqCDMA2000,
...,
        utra-TDD-r10
        CarrierFreqListUTRA-TDD-r10
}
RedirectedCarrierInfo-v9e0 ::=        SEQUENCE {
    eutra-v9e0                               ARFCN-ValueEUTRA-v9e0
}
CarrierFreqListUTRA-TDD-r10 ::=       SEQUENCE (SIZE (1..maxFreqUTRA-TDD-
r10)) OF ARFCN-ValueUTRA
IdleModeMobilityControlInfo ::=SEQUENCE {
    freqPriorityListEUTRA                    FreqPriorityListEUTRA
        OPTIONAL,       -- Need ON
    freqPriorityListGERAN                    FreqsPriorityListGERAN
        OPTIONAL,       -- Need ON
    freqPriorityListUTRA-FDD      FreqPriorityListUTRA-FDD
        OPTIONAL,       -- Need ON
    freqPriorityListUTRA-TDD      FreqPriorityListUTRA-TDD
        OPTIONAL,       -- Need ON
    bandClassPriorityListHRPD                BandClassPriorityListHRPD
        OPTIONAL,       -- Need ON
    bandClassPriorityList1XRTT               BandClassPriorityList1XRTT
        OPTIONAL,       -- Need ON
    t320                                     ENUMERATED {
                                                 min 5,
min10, min20, min30, min60, min120, min180,
                                                          spare1}
        OPTIONAL,             -- Need OR
    ...,
    [[ freqPriorityListExtEUTRA-r12          FreqPriorityListExtEUTRA-r12
        OPTIONAL       -- Need ON
    ]],
    [[ freqPriorityListEUTRA-v1310           FreqPriorityListEUTRA-v1310
        OPTIONAL,       -- Need ON
       freqPriorityListExtEUTRA-v1310        FreqPriorityListExtEUTRA-v1310
        OPTIONAL       -- Need ON
    ]],
    [[ freqPriorityListNR-v1510              FreqPriorityListNR-v1510
        OPTIONAL,       -- Need ON
    ]],
}
IdleModeMobilityControlInfo-v9e0      ::= SEQUENCE {
    freqPriorityListEUTRA-v9e0               SEQUENCE (SIZE (1..maxFreq)) OF
FreqPriorityEUTRA-v9e0
}
FreqPriorityListEUTRA ::=             SEQUENCE (SIZE (1..maxFreq)) OF
FreqPriorityEUTRA
FreqPriorityListExtEUTRA-r12 ::=      SEQUENCE (SIZE (1..maxFreq)) OF
    FreqPriorityEUTRA-r12
FreqPriorityListEUTRA-v1310 ::=              SEQUENCE (SIZE (1..maxFreq)) OF
FreqPriorityEUTRA-v1310
FreqPriorityListExtEUTRA-v1310 ::=           SEQUENCE (SIZE (1..maxFreq)) OF
FreqPriorityEUTRA-v1310
FreqPriorityEUTRA ::=                 SEQUENCE {
    carrierFreq                              ARFCN-ValueEUTRA,
    cellReselectionPriority                  CellReselectionPriority
}
FreqPriorityListNR-v1510 ::=          SEQUENCE (SIZE (1..maxFreq)) OF
FreqPriorityNR-v1510
FreqPriorityNR ::=                    SEQUENCE {
    carrierFreq                              ARFCN-ValueNR,
    sliceIdMapList    ::= SEQUENCE(SIZE (1..maxSliceMapping-r15)) OF
SliceMapInfo-r15,
    cellReselectionPriority                  CellReselectionPriority
}
FreqPriorityEUTRA-v9e0 ::=            SEQUENCE {
    carrierFreq-v9e0                         ARFCN-ValueEUTRA-v9e0
    OPTIONAL-- Cond EARFCN-max
}
FreqPriorityEUTRA-r12 ::=                    SEQUENCE {
    carrierFreq-r12                          ARFCN-ValueEUTRA-r9,
    cellReselectionPriority-r12              CellReselectionPriority
}
FreqPriorityEUTRA-v1310 ::=                  SEQUENCE {
    cellReselectionSubPriority-r13           CellReselectionSubPriority-
``` |

| RRCConnectionRelease message |
|---|

```
    r13                           OPTIONAL     -- Need ON
}
FreqsPriorityListGERAN ::=                    SEQUENCE (SIZE (1..maxGNFG)) OF
FreqsPriorityGERAN
FreqsPriorityGERAN ::=                        SEQUENCE {
    carrierFreqs                                  CarrierFreqsGERAN,
    cellReselectionPriority                       CellReselectionPriority
}
FreqPriorityListUTRA-FDD ::=                  SEQUENCE (SIZE (1..maxUTRA-FDD-
Carrier)) OF FreqPriorityUTRA-FDD
FreqPriorityUTRA-FDD ::=                      SEQUENCE {
    carrierFreq                                   ARFCN-ValueUTRA,
    cellReselectionPriority                       CellReselectionPriority
}
FreqPriorityListUTRA-TDD ::=                  SEQUENCE (SIZE (1..maxUTRA-TDD-
Carrier)) OF FreqPriorityUTRA-TDD
FreqPriorityUTRA-TDD ::=                      SEQUENCE {
    carrierFreq                                   ARFCN-ValueUTRA,
    cellReselectionPriority                       CellReselectionPriority
}
BandClassPriorityListHRPD ::=                 SEQUENCE (SIZE (1..maxCDMA-BandClass))
OF BandClassPriorityHRPD
BandClassPriorityHRPD ::=                     SEQUENCE {
    bandClass                                     BandclassCDMA2000,
    cellReselectionPriority                       CellReselectionPriority
}
BandClassPriorityList1XRTT ::= SEQUENCE (SIZE (1..maxCDMA-BandClass)) OF
BandClassPriority1XRTT
BandClassPriority1XRTT ::=                    SEQUENCE {
    bandClass                                     BandclassCDMA2000,
    cellReselectionPriority                       CellReselectionPriority
}
CellInfoListGERAN-r9 ::=                      SEQUENCE (SIZE (1..maxCellInfoGERAN-r9)) OF
CellInfoGERAN-r9
CellInfoGERAN-r9 ::=                          SEQUENCE {
    physCellId-r9                                 PhysCellIdGERAN,
    carrierFreq-r9                                CarrierFreqGERAN,
    systemInformation-r9                          SystemInfoListGERAN
}
CellInfoListUTRA-FDD-r9 ::=                   SEQUENCE (SIZE
(1..maxCellInfoUTRA-r9)) OF CellInfoUTRA-FDD-r9
CellInfoUTRA-FDD-r9 ::=                       SEQUENCE {
    physCellId-r9                                 PhysCellIdUTRA-FDD,
    utra-BCCH-Container-r9                        OCTET STRING
}
CellInfoListUTRA-TDD-r9 ::=                   SEQUENCE (SIZE
(1..maxCellInfoUTRA-r9)) OF CellInfoUTRA-TDD-r9
CellInfoUTRA-TDD-r9 ::=                       SEQUENCE {
    physCellId-r9                                 PhysCellIdUTRA-TDD,
    utra-BCCH-Container-r9                        OCTET STRING
}
CellInfoListUTRA-TDD-r10 ::=                  SEQUENCE (SIZE
(1..maxCellInfoUTRA-r9)) OF CellInfoUTRA-TDD-r10
CellInfoUTRA-TDD-r10 ::=                      SEQUENCE {
    physCellId-r10                                PhysCellIdUTRA-TDD,
    carrierFreq-r10                               ARFCN-ValueUTRA,
    utra-BCCH-Container-r10                       OCTET STRING
}
CellSliceMapInfoListEUTRA-FDD-r15 ::=                 SEQUENCE (SIZE
(1..maxCellSliceMapInfoEUTRA-r15)) OF CellSliceMapInfoEUTRA-FDD-r15
CellSliceMapInfoEUTRA-FDD-r15 ::=                     SEQUENCE {
    physCellId-r15                                PhysCellIdEUTRA-FDD,
    eutra-BCCH-Container-r15                      OCTET STRING,
    sliceIdMapList   ::= SEQUENCE(SIZE (1..maxSliceMapping-r15)) OF
SliceMapInfo-r15
}
CellSliceMapInfoListEUTRA-TDD-r15 ::=         SEQUENCE (SIZE
(1..maxCellSliceMapInfoEUTRA-r15)) OF CellSliceMapInfoEUTRA-TDD-r15
CellSliceMapInfoEUTRA-TDD-r15 ::=                     SEQUENCE {
    physCellId-r15                                PhysCellIdEUTRA-TDD,
    eutra-BCCH-Container-r15                      OCTET STRING,
    sliceIdMapList   ::= SEQUENCE(SIZE (1..maxSliceMapping-r15)) OF
SliceMapInfo-r15
}
CellSliceMapInfoListNR-FDD-r15 ::=            SEQUENCE (SIZE
(1..maxCellSliceMapInfoNR-r15)) OF CellSliceMapInfoNR-FDD-r15
CellSliceMapInfoNR-FDD-r15 ::=                        SEQUENCE {
```

| RRCConnectionRelease message |
| --- |
| physCellId-r15                              PhysCellIdNR-FDD,<br>eutra-BCCH-Container-r15                 OCTET STRING,<br>sliceIdMapList                 ::= SEQUENCE(SIZE (1..maxSliceMapping-r15))<br>OF SliceMapInfo-r15<br>}<br>CellSliceMapInfoListNR-TDD-r15 ::=           SEQUENCE (SIZE<br>(1..maxCellSliceMapInfoNR-r15)) OF CellSliceMapInfoNR-TDD-r15<br>CellSliceMapInfoNR-TDD-r15 ::=               SEQUENCE {<br>   physCellId-r15                          PhysCellIdNR-TDD,<br>   eutra-BCCH-Container-r15                OCTET STRING,<br>   sliceIdMapList        ::= SEQUENCE(SIZE (1..maxSliceMapping-r15)) OF<br>SliceMapInfo-r15<br>}<br>SliceMapInfo-r15    ::= SEQUENCE {<br>   carrierFreq-r15                         ARFCN-ValueEUTRA-NR-r15, OPTIONAL<br>   AS-Slice-ID                             BIT STRING(SIZE(x)),<br>   S-NSSAI                                 BIT STRING(SIZE(32))<br>}<br>-- ASN1STOP |

In a further variant of Embodiment 2 the gNB may also provide information on the AS slice ID and the corresponding short-to-full slice ID mapping to neighbour cells (and their gNBs) on Xnso they can be used for handover purposes and for cell(re)selection parameters broadcast. The gNBs can thus also provide the AS slice ID and corresponding mapping information of neighbor cell(s) to the UEs, e.g., as part of system information, system information on demand, or in dedicated UE-addressed signaling (such as the RRC Connection Release message and the neighbor-cell-related elements therein, e.g., the "neighSliceMapInfoList-r9").

Based on any of the above-discussed manners, the UE is thus informed about the AS-Slice ID and the corresponding mapping, such that the UE can use same in further operation. For instance, the network slice ID information is typically used when the UE needs to connect to the core network (or resume a previous connection) so as to be able to transmit and/or receive data. The RAN (e.g., gNB) can choose the core elements suitable for the indicated network slice(s) based on the indication by the UE for which network slice the connection and service should be set up. The gNB, based on the short-to-full slice ID mapping, can unambiguously derive the network slice from the received shortened AS slice ID.

When exemplarily assuming a transmission of data triggered within the UE (uplink data), the procedure to prepare for the data transmission might involve that a NAS layer of the UE provides an indication to a lower layer of the UE regarding which network slice should be used for the data transmission. The NAS layer might use for the inter-layer communication within the UE the full network slice ID, such that a lower layer of the UE derives therefrom the shorter AS slice ID based on the mapping obtained before from the gNB. The subsequent connection and service setup performed between the UE and the gNB to prepare for the data transmission can then be performed based on the shorter AS slice ID as will be explained below.

When exemplarily assuming that the UE is paged because data is available for the UE in the downlink, the UE needs to be provided with the information about which network slice the paging is intended for. Correspondingly, any of the above-discussed variants of Embodiment 1 can thus be used in said respect, resulting in a suitable combination of Embodiments 1 and 2. Embodiment 1 provides solutions on how to inform the UE on the network slice the paging is intended for, wherein the gNB can optionally use the shorter AS slice ID (of Embodiment 2) instead of the full network slice ID for the paging on the air interface. Also in this case, the UE can determine—when necessary—the full network slice ID from the received shorter AS slice ID, based on the mapping previously obtained from the gNB.

In both exemplary cases (uplink or downlink) it might be necessary to setup or resume connections and services with the gNB and the core network, which might for instance involve performing a random access procedure (RACH procedure) between the UE and the gNB as generally explained in the section "Basis of the present disclosure" as well as the transmission of a NAS service request message from the UE to the gNB When performing the RACH procedure with the gNB, the UE can transmit the AS slice ID as part of message 3, e.g., within the RRC connection Request message. This is illustrated in FIG. 10, showing that the RRC Connection Request message comprises the shortened AS slice ID. Instead of an RRC Connection Request message, the UE might transmit an RRC Resume Request message within the third message of the RACH procedure, including the AS slice ID. At present, message 3 of the RACH procedure is rather limited in its size and it is disadvantageous to include too many bits. Consequently, while it might be possible to transmit the shortened AS slice ID with message 3 of the RACH procedure, it might not be possible to transmit the full network slice ID therein.

Alternatively or in addition, the shortened AS slice ID could be transmitted by the UE as part of the NAS service request message to the gNB, which is transmitted after completion of the RACH procedure. This solution is exemplarily illustrated in FIG. 11.

When using the Message 3 of the RACH procedure, it is possible to perform a slice-specific admission control at an early stage of the data transmission preparation procedure. More specifically, slice specific admission control can be performed, e.g., by gNB at AS level before interacting with the core. For instance, the core network might decide that some of its core network entities are already overloaded for particular network slices and that further connections to those core network entities would have to be rejected. Accordingly, the core network will provide an overload indication for specific network slices to gNBs to facilitate a quick slice-specific admission control at the RAN side.

Figure 12:
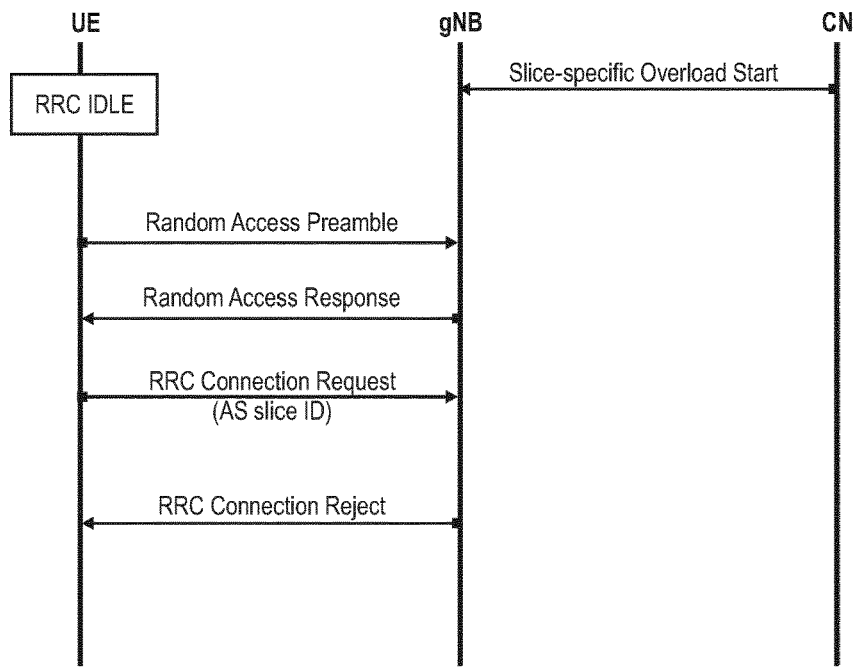
FIG. 12 is a message diagram illustrating the slice-specific admission control that is possible according to one variant of the second embodiment.

Correspondingly, the gNB would determine whether a further connection to suitable core network entities is possible for the network slice indicated by the UE based on the AS slice ID and based on the overload indication received previously from the CN. In case the gNB determines that the connection requested by the UE for the specific indicated network slice is not possible, the connection or resume request by the UE can be immediately rejected. In said respect, the gNB can return an RRC connection reject message to the UE. This slice-specific admission control is conceptually illustrated in FIG. 12.

When using a later message to convey the identification information of the network slice (such as NAS service request message), extra signaling and time delay might be incurred.

In case more than one network slices are indicated in the third message of the RACH procedure, and depending on which network slices are overloaded in the 5G core network, the gNB can also return suitable information to the UE such that the UE is able to derive which of the requested network slices are overloaded and which are not overloaded. In said respect, in one exemplary implementation the gNB might include identification information (e.g., the shortened network slice ID) on either the overloaded or not overloaded network slices into the RRC connection setup or reject message Another exemplary implementation of Embodiment 2 assumes that the shortened network slice ID is UE specific. If such UE-specific slice information is passed on to a gNB by a core at the time of UE making a network connection, it can provide UE specific RAN-part to core-part Slice mapping to be used in its cells as part of SI on-demand or UE specific high-level signaling at the time of Security-ModeCommand, RRCConnectionReconfiguration. A UE which is in either RRC IDLE or INACTIVE STATE, can use this UE Specific bit pattern on air interface at a time of Service Request According to a particular variant of Embodiment 2, when defining the shortened AS slice ID, the frequently-used network slices would be identified by the shortened AS slice ID, while less frequently-used network slices are not identifiable with the shortened AS slice ID but with the full network slice ID. In this particular variant the UE can use any of the available network slices, and then convey identification information on the determined network slice (be it the shortened AS slice ID or the full network slice ID) to the gNB. In case the determined network slice can be identified by a shortened AS slice ID, the UE may transmit said shortened AS slice ID within message 3 of the RACH procedure (e.g., the RRC Connection Request or RRC Resume Request message). On the other hand, in case the determined network slice is to be identified by the full network slice ID, the UE may transmit said full network slice ID within the NAS service request message, e.g., message 5 after message 4 of the RACH procedure (assuming that the limited size available in message 3 does not suffice to comprise one or more of the full network slice IDs to be transmitted).

If cell specific mapping is used, the network would only advertise frequently used slice or latency sensitive service. These advertised Slice IDs take shorter bit length. Non-advertised Slices take longer bit-length (e.g., max S-NNSAI size). Then one possible way would be that a UE can send short-ID in Msg3 but long-ID can be only sent in Msg5. Then there is no need to have the flag of short-ID or long-ID.

Figure 13:
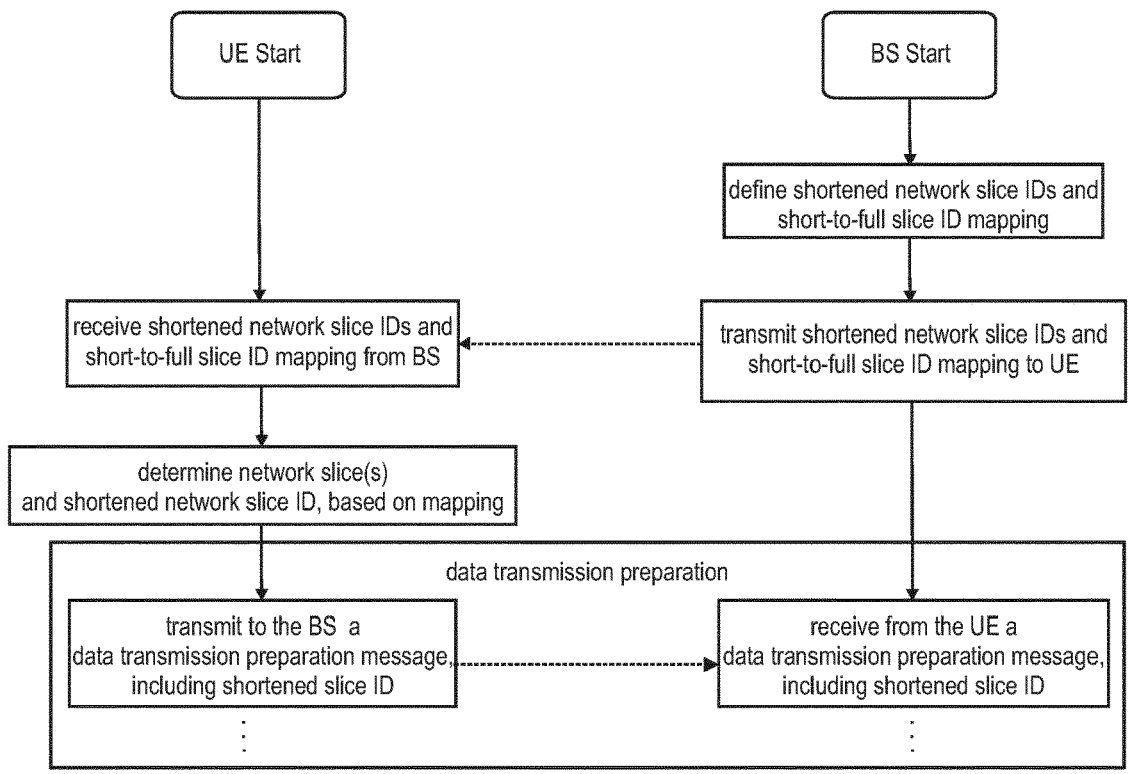
FIG. 13 is a sequence diagram of the UE and base station behavior according to one variant of the second embodiment.

Embodiment 2 accordingly provides suitably configured gNB(s) (base station) and UEs that can carry out the improved network slice identification and connection and service setup procedure according to any of the various implementations discussed above. The base station and UEs can contain units as exemplified in FIG. 6 to perform the tasks and steps necessary to participate in Embodiment 2. FIG. 13 illustrates the behavior of the gNB (BS) as well as the UE according to an exemplary basic variant of Embodiment 2. In more detail, the gNB (e.g., a processor thereof) can determine the shortened network slice IDs and the corresponding short-to-full slice ID mapping for a specific (limited) number of network slices. Information on the shortened network slice IDs and the corresponding mapping is then transmitted by the gNB (e.g., by a transmitter thereof) to the UE (e.g., as a broadcast or with dedicated signaling). This information can be used by the UE for future communication with the gNB and core network. Correspondingly, the UE may eventually (e.g., in order to be able to transmit data in the uplink) determine (e.g., by a processor thereof) one or more network slices and the corresponding shortened network slice ID, based on the mapping received before from the gNB.

In subsequent steps, the UE (e.g., a transmitter thereof) will inform the gNB about the network slice intended to be used (e.g., for the uplink data transmission) using the shortened network slice ID(s), that can be transmitted in a corresponding message of a data transmission preparation procedure (e.g., message 3 of the RACH procedure or the NAS service request message).

Further Aspects

According to a first aspect, a user equipment is provided comprising a receiver for receiving a paging message from a base station that controls a radio cell of a mobile communication system in which the user equipment is located. The UE further comprises a processor that determines at least one of a plurality of network slices to which the paging message pertains based on the received paging message.

According to a second aspect provided in addition to the first aspect, determining the at least one network slice is performed based on one or a combination of:
  network slice identification information for the at least one network slice comprised in the paging message;
  timing and/or frequency resources used by the user equipment for receiving the paging message; and
  a radio resource numerology scheme used by the user equipment for receiving the paging message.

According to a third aspect provided in addition to the first or second aspect, each of the plurality of network slices is associated with a network slice ID that is unambiguous within the mobile communication system and/or unambiguous within the radio cell controlled by the base station and/or unambiguous for the user equipment.

According to a fourth aspect provided in addition to any of first to third aspects, the plurality of network slices provides different logical networks with specific network capabilities and network characteristics. Optionally, each network slice comprises a radio-cell-related part and a core-network-related part being unambiguously associated with each other.

According to a fifth aspect provided in addition to any of the first to fourth aspects, the UE comprises a transmitter a transmitter transmits a data transmission preparation message to the base station that comprises identification information on the determined at least one network slice. Optionally, the data transmission preparation message is a connection request transmitted to the base station by the user equipment as part of a random access procedure performed between the user equipment and the base station or is a service request transmitted to the base station by the user equipment after completing a random access procedure performed between the user equipment and the base station.

According to a sixth aspect, a method for performing paging is provided that comprises the following steps performed by a user equipment. The UE receives a paging message from a base station that controls a radio cell of a mobile communication system in which the user equipment is located. Then, the UE determines at least one of a plurality of network slices to which the paging message pertains based on the received paging message.

According to a seventh aspect, a base station is provided that comprises a transmitter for transmitting a paging message to a user equipment, which is located in a radio cell of a mobile communication system controlled by the base station, such that the user equipment can determine at least one of a plurality of network slices to which the paging message pertains based on the received paging message.

According to a eighth aspect provided in addition to the seventh aspect, transmitting the paging message comprises one or a combination of:
including network slice identification information for the at least one network slice into the paging message;
determining and using, based on the at least one network slice, timing and/or frequency resources for transmitting the paging message; and
determining and using, based on the at least one network slice, a radio resource numerology scheme for transmitting the paging message.

According to a ninth aspect provided in addition to the seventh or eighth aspect, the base station further comprises a receiver that receives from a core network entity another paging message including identification information of the at least one network slice to which the other paging message pertains. Transmitting the paging message to the user equipment is performed in response to receiving the other paging message. In addition or alternatively, the base station comprises a transmitter for transmitting to one or more other base stations the identification information of the at least one network slice together with a request to page the user equipment in the respective radio cell.

According to a tenth aspect, a user equipment is provided comprising a receiver, that receives, from a base station controlling the radio cell of a mobile communication system in which the user equipment is located, information on a plurality of network slices. The information at least includes for each network slice a shortened network slice ID identifying the respective network slice as well as including mapping information defining a mapping between the shortened network slice ID and a full network slice ID that unambiguously identifies the network slice within the mobile communication system. The UE further comprises a processor that determines at least one out of the plurality of network slices and the corresponding full network slice ID. The processor further determines the corresponding at least one shortened network slice ID based on the received mapping information. The UE further comprises a transmitter that transmits a data transmission preparation message to the base station that comprises the determined at least one shortened network slice ID.

According to an eleventh aspect provided in addition to the tenth aspect, the shortened network slice ID is part of the full network slice ID, for example the four least significant bits of the full network slice ID.

According to a twelfth aspect in addition to the tenth or eleventh aspect, the data transmission preparation message is a connection request transmitted to the base station by the user equipment as part of a random access procedure performed between the user equipment and the base station or is a service request transmitted to the base station by the user equipment after completing a random access procedure performed between the user equipment and the base station.

According to a thirteenth aspect provided in addition to any of the tenth to the twelfth aspects, the information on the plurality of network slices can be received by the user equipment via system information broadcast by the base station in the radio cell. Optionally, the system information is transmitted by the base station in the radio cell in response to a request by the user equipment. In addition or alternatively, the information on the plurality of network slices can be received by the user equipment in a dedicated message transmitted from the base station and addressed to the user equipment.

According to a fourteenth aspect provided in addition to any of the tenth to thirteenth aspects, the receiver receives from the base station further mapping information defining a mapping between the full network slice ID and one of the plurality of network slices.

According to a fifteenth aspect provided in addition to any of the tenth to fourteenth aspects, the shortened network slice ID is defined such that it unambiguously identifies the network slice within the radio cell controlled by the base station, and the mapping information is specific to the radio cell and can be used by a plurality of user equipment in the radio cell. In addition or alternatively, the shortened network slice ID is defined such that it unambiguously identifies the network slice for each user equipment and the mapping information is specific to the respective user equipment and can only be used by the respective user equipment.

According to a sixteenth aspect, a method is provided comprising the following steps performed by a user equipment. The UE receives, from a base station controlling the radio cell of a mobile communication system in which the user equipment is located, information on a plurality of network slices. The information at least includes for each network slice a shortened network slice ID identifying the respective network slice as well as including mapping information defining a mapping between the shortened network slice ID and a full network slice ID that unambiguously identifies the network slice within the mobile communication system. The UE determines at least one out of the plurality of network slices and the corresponding full network slice ID. The UE determines the corresponding at least one shortened network slice ID based on the received mapping information. The UE transmits a data transmission preparation message to the base station that comprises the determined at least one shortened network slice ID.

According to a seventeenth aspect, a base station is provided comprising a transmitter that transmits information on a plurality of network slices to a user equipment located in a radio cell of the mobile communication system that is controlled by the base station. The information at least includes for each network slice a shortened network slice ID identifying the respective network slice as well as including mapping information defining a mapping between the shortened network slice ID and a full network slice ID that unambiguously identifies the network slice within the mobile communication system. The base station includes a receiver that receives a data transmission preparation message from the user equipment that comprises the determined at least one shortened network slice ID.

According to an eighteenth aspect in addition to the seventeenth aspect, the base station further comprises a processor that defines the shortened network slice IDs for each network slice and defines the mapping information defining a mapping between the shortened network slice ID and the full network slice ID.

In an embodiment, the techniques disclosed here feature a user equipment which comprises a transmitter, a receiver and a processor as follows. The receiver receives, from a base station controlling the radio cell of a mobile communication system in which the user equipment is located, information on a plurality of network slices, the information at least including for each network slice a shortened network slice ID identifying the respective network slice as well as including mapping information defining a mapping between the shortened network slice ID and a full network slice ID that unambiguously identifies the network slice within the mobile communication system. The processor determines at least one out of the plurality of network slices and the corresponding full network slice ID. The processor further determines the corresponding at least one shortened network slice ID based on the received mapping information. The transmitter transmits a data transmission preparation message to the base station that comprises the determined at least one shortened network slice ID.

In an embodiment, the techniques disclosed here feature a method comprising the following steps performed by a UE. The UE receives, from a base station controlling the radio cell of a mobile communication system in which the user equipment is located, information on a plurality of network slices, the information at least including for each network slice a shortened network slice ID identifying the respective network slice as well as including mapping information defining a mapping between the shortened network slice ID and a full network slice ID that unambiguously identifies the network slice within the mobile communication system. The UE determines at least one out of the plurality of network slices and the corresponding full network slice ID, and determines the corresponding at least one shortened network slice ID based on the received mapping information. The UE transmits a data transmission preparation message to the base station that comprises the determined at least one shortened network slice ID.

In an embodiment, the techniques disclosed here feature a base station which comprises a transmitter, a receiver and a processor as follows. The transmitter transmits information on a plurality of network slices to a user equipment located in a radio cell of the mobile communication system that is controlled by the base station, the information at least including for each network slice a shortened network slice ID identifying the respective network slice as well as including mapping information defining a mapping between the shortened network slice ID and a full network slice ID that unambiguously identifies the network slice within the mobile communication system. The receiver receives a data transmission preparation message from the user equipment that comprises the determined at least one shortened network slice ID.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a receiver, which in operation, receives, from a base station controlling a radio cell of a mobile communication system in which the user equipment is located, information on a plurality of network slices, the information at least including for each network slice of the plurality of network slices a shortened network slice ID identifying the respective network slice and including mapping information defining a mapping between the shortened network slice ID and a full network slice ID that unambiguously identifies the network slice within the mobile communication system;
a processor, which in operation, determines at least one out of the plurality of network slices and a corresponding full network slice ID, wherein the processor, when in operation, further determines a corresponding at least one shortened network slice ID based on the received mapping information, wherein the at least one shortened network slice ID is four least significant bits of the full network slice ID; and a transmitter, which in operation, transmits a data transmission preparation message to the base station that comprises the determined at least one shortened network slice ID.

2. The user equipment according to claim 1, wherein the at least one shortened network slice ID is part of the full network slice ID.

3. The user equipment according to claim 1, wherein the data transmission preparation message is a connection request or a resume request transmitted to the base station by the user equipment as part of a random access procedure performed between the user equipment and the base station or is a service request transmitted to the base station by the user equipment after completing the random access procedure performed between the user equipment and the base station.

4. The user equipment according to claim 1,
wherein the information on the plurality of network slices is received by the user equipment via system information broadcast from the base station in the radio cell, wherein the system information is transmitted by the base station in the radio cell in response to a request by the user equipment, and/or wherein the information on the plurality of network slices is received by the user equipment in a dedicated message transmitted from the base station and addressed to the user equipment.

5. The user equipment according to claim 1, wherein the receiver, when in operation, receives from the base station further mapping information defining a mapping between the full network slice ID and one of the plurality of network slices.

6. The user equipment according to claim 1,
wherein the at least one shortened network slice ID is defined such that it unambiguously identifies the network slice within the radio cell controlled by the base station, and the mapping information is specific to the radio cell and is used by a plurality of user equipment in the radio cell, and/or wherein the at least one shortened network slice ID is defined such that it unambiguously identifies the network slice for each user equipment and the mapping information is specific to the respective user equipment and is only used by the respective user equipment.

\* \* \* \* \*